United States Patent
Nguyen et al.

(10) Patent No.: US 9,080,094 B2
(45) Date of Patent: Jul. 14, 2015

(54) METHODS AND COMPOSITIONS FOR ENHANCING WELL PRODUCTIVITY IN WEAKLY CONSOLIDATED OR UNCONSOLIDATED FORMATIONS

(75) Inventors: Philip D. Nguyen, Houston, TX (US); Jeff T. Fleming, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 440 days.

(21) Appl. No.: 13/591,356

(22) Filed: Aug. 22, 2012

(65) Prior Publication Data
US 2014/0054034 A1 Feb. 27, 2014

(51) Int. Cl.
| E21B 43/267 | (2006.01) |
| --- | --- |
| E21B 33/13 | (2006.01) |
| C09K 8/50 | (2006.01) |
| C09K 8/56 | (2006.01) |
| C09K 8/62 | (2006.01) |
| C09K 8/80 | (2006.01) |
| E21B 43/02 | (2006.01) |
| E21B 33/134 | (2006.01) |

(52) U.S. Cl.
CPC ... *C09K 8/50* (2013.01); *C09K 8/56* (2013.01); *C09K 8/62* (2013.01); *C09K 8/805* (2013.01); *E21B 43/267* (2013.01); *C09K 2208/18* (2013.01); *E21B 33/134* (2013.01); *E21B 43/025* (2013.01)

(58) Field of Classification Search
CPC ............ C09K 8/68; C09K 8/88; C09K 8/685; C09K 8/90; C09K 2208/18; C09K 8/80; E21B 43/26; E21B 43/267; E21B 43/04; E21B 33/134; E21B 33/13; E21B 33/138; E21B 43/025
See application file for complete search history.

(56) References Cited

U.S. PATENT DOCUMENTS

| 4,585,064 A | 4/1986 | Graham et al. |
| --- | --- | --- |
| 4,670,501 A | 6/1987 | Dymond et al. |
| 5,249,627 A | 10/1993 | Harms et al. |
| 5,833,000 A | 11/1998 | Weaver et al. |
| 5,839,510 A | 11/1998 | Weaver et al. |
| 5,853,048 A | 12/1998 | Weaver et al. |
| 6,287,639 B1 | 9/2001 | Schmidt et al. |
| 6,311,773 B1 | 11/2001 | Todd et al. |
| 6,439,309 B1 | 8/2002 | Matherly et al. |
| 6,488,091 B1 | 12/2002 | Weaver et al. |
| 6,582,819 B2 | 6/2003 | McDaniel et al. |
| 6,677,426 B2 | 1/2004 | Noro et al. |
| 7,040,403 B2 | 5/2006 | Nguyen et al. |
| 7,153,575 B2 | 12/2006 | Anderson et al. |
| 7,392,847 B2 | 7/2008 | Gatlin et al. |
| 7,413,017 B2 | 8/2008 | Nguyen et al. |
| 7,673,686 B2 | 3/2010 | Nguyen et al. |
| 7,819,192 B2 | 10/2010 | Weaver et al. |
| 7,825,074 B2 | 11/2010 | Schmidt et al. |
| 7,829,507 B2 | 11/2010 | Todd et al. |
| 7,956,017 B2 | 6/2011 | Gatlin et al. |
| 8,003,579 B2 | 8/2011 | Akarsu et al. |
| 8,167,042 B2 | 5/2012 | Todd |
| 2004/0094300 A1* | 5/2004 | Sullivan et al. ............ 166/308.1 |
| 2005/0274517 A1 | 12/2005 | Blauch et al. |
| 2005/0277554 A1 | 12/2005 | Blauch et al. |
| 2006/0032633 A1 | 2/2006 | Nguyen |
| 2006/0065397 A1* | 3/2006 | Nguyen et al. ............ 166/280.1 |
| 2006/0185848 A1 | 8/2006 | Surjaatmadja et al. |
| 2007/0131422 A1 | 6/2007 | Gatlin et al. |
| 2007/0131425 A1 | 6/2007 | Gatlin et al. |
| 2007/0289781 A1 | 12/2007 | Rickman et al. |
| 2008/0006405 A1 | 1/2008 | Rickman et al. |
| 2008/0093073 A1 | 4/2008 | Bustos et al. |
| 2008/0289828 A1* | 11/2008 | Hutchins et al. ........... 166/308.3 |
| 2010/0089581 A1 | 4/2010 | Nguyen et al. |
| 2010/0160187 A1 | 6/2010 | Nguyen et al. |
| 2010/0212898 A1 | 8/2010 | Nguyen et al. |
| 2011/0030950 A1 | 2/2011 | Weaver et al. |
| 2011/0039737 A1 | 2/2011 | Schmidt et al. |
| 2011/0067868 A1 | 3/2011 | Le Roy-Delage et al. |

FOREIGN PATENT DOCUMENTS

WO 2014031569 A1 2/2014

OTHER PUBLICATIONS

International Search Report and Written Opinion for PCT/US2013/055664 dated Nov. 15, 2013.
Official Action for Australian Patent Application No. 2013306000 dated Mar. 11, 2015.

* cited by examiner

*Primary Examiner* — Zakiya W Bates
(74) *Attorney, Agent, or Firm* — McDermott Will & Emery LLP; Holly Soehnge

(57) ABSTRACT

Methods of fracturing a subterranean formation that include the steps of placing a stabilizing fluid comprising a formation stabilizing agent and a degradable fluid loss controlling agent into the subterranean formation at a pressure sufficient to create or enhance at least one fracture therein, wherein the degradable fluid loss controlling agent at least partially covers a face of the fracture; placing a treatment fluid comprising proppants into at least a portion of the fracture; bridging the fluid loss controlling agent, the proppants, or both at or near the tip of the fracture to induce a tip screenout; allowing the proppants to form a proppant pack in the portion of the fracture; and allowing the degradable fluid loss controlling agent to degrade.

18 Claims, No Drawings

METHODS AND COMPOSITIONS FOR ENHANCING WELL PRODUCTIVITY IN WEAKLY CONSOLIDATED OR UNCONSOLIDATED FORMATIONS

BACKGROUND

The present invention relates to fracturing operations and, more particularly, to methods of enhancing well productivity in propped fractures in portions of subterranean formations in weakly consolidated or unconsolidated formations.

Hydrocarbon producing wells are often located in subterranean zones that contain unconsolidated particulates (e.g., formation sand and fines) that can migrate with oil, gas, water, and other fluids produced by the subterranean formation. The presence of particulates in the production fluids is generally undesirable as they can cause abrasive wear to components such as screens, tubing, pumps, and valves. In some scenarios, particulates can clog the well, thus creating the need for expensive remedial treatments. If the particulates are carried to the surface, they may have to be removed from the production fluid using surface processing equipment.

The recovery of production fluids from weakly consolidated or unconsolidated formations can be enhanced by certain stimulation techniques. For example, hydraulic fracturing can create high-conductivity communication with a large area of a formation and bypass damage that may exist in the near-wellbore area. Hydraulic fracturing is a technique in which fractures are propagated in a rock layer for the eventual purpose of extracting certain fluids such as petroleum, natural gas, coal seam gas, and the like. The technique can be used to increase or restore the rate at which these fluids can be produced from a subterranean formation.

Conventional methods for preventing the production of particulate materials during fracturing operations include, for example, gravel packing the well adjacent to the weakly consolidated or unconsolidated production interval. A sand control screen (or "gravel-pack screen") is a filter assembly that can be used to support and retain the sand placed during a gravel pack operation. Typically, the sand control screen is lowered into a wellbore on a work string and positioned relative to the desired production interval. Next, a fluid slurry that includes gravel is pumped down the work string and into the well annulus formed between the sand control screen and the perforated well casing or open hole production zone.

In some cases, the processes of hydraulic fracturing and gravel packing can be combined into a unified treatment that can stimulate production while providing an annular gravel pack for sand control. Such treatments are often referred to as "frac-pack" operations. Frac-pack operations may be conducted with a gravel pack screen assembly in place, by pumping the fracturing fluid through an annular space between the screen and casing (or between the screen and the walls of the well bore, in "open hole" wells that are completed without casing). One of the goals of frac-packing operations is to create short, wide, highly conductive fractures and then to pack the area between the screen and the perforated casing or the inside wellbore surfaces (the "sandface") by continually injecting slurry after the fracture has been filled with proppant and packed off.

A common method of creating short, wide fractures is to initiate a tip screenout during the pumping operation. In a tip screenout, the solids (e.g., proppants) concentration at the tip of the fracture becomes high due to fluid leak-off into the formation such that the slurry is no longer mobile. The concentrated proppant slurry plugs the fracture, preventing additional growth of the fracture length. Additional pumping of the proppant/fluid slurry into the formation after the screenout occurs causes the fracture to balloon. Therefore, a practical method of hindering the migration of formation sands and fines while inducing tip screenout in weakly consolidated or unconsolidated formations may be of value to one of ordinary skill in the art.

SUMMARY OF THE INVENTION

The present invention relates to fracturing operations and, more particularly, to methods of enhancing well productivity in propped fractures in portions of subterranean formations in weakly consolidated or unconsolidated formations.

In some embodiments, the present invention provides a method of fracturing a subterranean formation comprising placing a stabilizing fluid comprising a formation stabilizing agent and a degradable fluid loss controlling agent into the subterranean formation at a pressure sufficient to create or enhance at least one fracture therein, wherein the degradable fluid loss controlling agent at least partially covers a face of the fracture; placing a treatment fluid comprising proppants into at least a portion of the fracture; allowing the fluid loss controlling agent, the proppants, or an interaction thereof to cause bridging and to induce a tip screenout; allowing the proppants to form a proppant pack in the portion of the fracture; and allowing the degradable fluid loss controlling agent to degrade.

In other embodiments, the present invention provides a method of fracturing a subterranean formation comprising placing a stabilizing fluid comprising a formation stabilizing agent and a degradable fluid loss controlling agent into the subterranean formation at a pressure sufficient to create or enhance at least one fracture therein, wherein the degradable fluid loss controlling agent at least partially covers a face of the fracture; placing a proppant slurry comprising a treatment fluid, wherein the treatment fluid comprises a carrier fluid, proppants, and degradable particulates into at least a portion of the fracture; allowing the fluid loss controlling agent, the proppants, the degradable particulates, or an interaction thereof to cause bridging and to induce a tip screenout; allowing the proppants to form a proppant pack in the portion of the fracture; and allowing the degradable fluid loss controlling agent and the degradable particulates to degrade.

The features and advantages of the present invention will be readily apparent to those skilled in the art upon a reading of the description of the preferred embodiments that follows.

DETAILED DESCRIPTION

The present invention relates to fracturing operations and, more particularly, to methods of enhancing well productivity in propped fractures in portions of subterranean formations in weakly consolidated or unconsolidated formations.

The present invention provides methods and compositions used during frac-pack operations in weakly consolidated and unconsolidated formations to enhance well productivity. In some embodiments, the present invention initiates a tip screenout that can create relatively short, wide fractures that tend to be highly conductive during recovery of production fluids. In some embodiments, the present invention can consolidate weakly consolidated or unconsolidated particulates that may otherwise migrate with production fluids during frac-pack operations.

In one embodiment, the present invention provides a method of fracturing a subterranean formation comprising placing a stabilizing fluid comprising a formation stabilizing agent and a degradable fluid loss controlling agent into the subterranean formation at a pressure sufficient to create or enhance at least one fracture therein, wherein the degradable fluid loss controlling agent at least partially covers a face of the fracture; placing a treatment fluid comprising proppants into at least a portion of the fracture; allowing the fluid loss controlling agent, the proppants, or an interaction thereof to cause bridging and to induce a tip screenout; allowing the proppants to form a proppant pack in the portion of the fracture; and allowing the degradable fluid loss controlling agent to degrade. In other embodiments, the treatment fluid may comprise proppants and degradable particulates. As used herein, "formation stabilizing agent" refers to any compound that is capable of minimizing particulate migration. The formation stabilizing agent of the present invention may, among other things, consolidate weakly consolidated or unconsolidated (e.g., formation sand and fines) particulates present in the subterranean formation. As used herein, the term "proppant pack" refers to a tight pack of particulates (e.g., proppants) which serve to prevent the fracture from fully closing once hydraulic pressure is removed.

"Degradable fluid loss controlling agent," as used herein, refers to any compound that can mitigate or reduce the undesirable migration or loss of fluids (e.g., the fluid portion of a drilling mud or cement slurry) into a subterranean formation and/or proppant pack. The degradable fluid loss controlling agent of the present invention may, among other things, function as a diverting agent to enhance the effectiveness of the treatment interval; function as a temporary bridging, filtercake, or fluid loss control agent; function as a delayed, self-release breaking agent to break down the filtercake and/or gel residues for enhancing their removal from the fracture and proppant pack; and/or function as a bridging-promoting material to induce tip screenout. As used herein, "tip screenout" refers to the accumulation of solids (e.g., proppants, degradable fluid controlling agents) at a portion of a fracture (e.g., a tip of the fracture) which prevents additional growth of the fracture. In some embodiments of the present invention, the stabilizing fluid and/or the treatment fluid may be placed into the fracture at a pressure sufficient to widen the fracture after induction of tip screenout.

In some embodiments of the present invention, the degradable fluid loss controlling agent in the stabilizing fluid may induce tip screenout. In some embodiments, proppants within the treatment fluid may induce tip screenout. In other embodiments, the degradable particulates within the treatment fluid may induce tip screenout. In still other embodiments, an interaction between any of the degradable fluid loss controlling agent, the proppants, and or the degradable particulates may induce tip screenout.

In some embodiments of the present invention, the treatment fluid comprising proppants further comprises degradable particulates. The degradable particulates may act to increase the voids or channels between proppant packs after the fracture closes. Once placed within a fracture, the degradable components are allowed to break down into a liquid phase and are then removed from the propped fracture, leaving behind proppant packs that act as pillars or masses to keep the fracture from closing while allowing voids and channels to form surrounding the proppant packs. Preferably, the pressure within the subterranean formation is allowed to reduce below the pressure sufficient to create or enhance fractures within the subterranean formation after the degradable particulates are placed and before the degradable particulates degrade. In some embodiments, the degradable fluid loss controlling agent may interact with the proppants in the treatment fluid (e.g., if the treatment fluid is placed in the fracture prior to the degradation of the degradable fluid loss controlling agent) to increase the voids or channels between proppant packs after fracture closure and degradation of the degradable fluid loss controlling agent.

According to some embodiments of the present invention, a fracturing system may be used to create or enhance at least one fracture in a subterranean formation and then to prop the fracture. In these embodiments, any fluid suitable for a fracturing or frac-packing application may be used in accordance with the teachings of the present invention as a stabilizing fluid or a treatment fluid, including aqueous gels, viscoelastic surfactant gels, oil gels, foamed gels, emulsions, and any combination thereof. For simplicity, these fluids may be herein jointly referred to as "treatment fluids" prior to inclusion of any additional elements. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a gas, such as carbon dioxide or nitrogen. In some embodiments of the present invention, the treatment fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, treatment fluid, in situ, reduces fluid loss and allows the fluid to transport significant quantities of suspended proppant particles. The water used to form the treatment fluid may be salt water, brine, or any other aqueous liquid that does not adversely react with the other components. The density of the water can be increased to provide additional transport and suspension in the present invention.

A variety of gelling agents may be used, including hydratable polymers that contain one or more functional groups such as hydroxyl, carboxyl, sulfate, sulfonate, amino, or amide groups. Suitable gelling agents typically comprise polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued to Weaver, et al., the entire disclosure of which is incorporated herein by reference. Suitable gelling agents generally are present in the viscosified treatment fluids of the present invention in an amount in the range of from about 0.1% to about 5% by weight of the water therein. In certain embodiments, the gelling agents are present in the treatment fluids of the present invention in an amount in the range of from about 0.01% to about 2% by weight of the water therein.

Crosslinking agents may be used to crosslink gelling agent molecules to form crosslinked gelling agents. Crosslinkers typically comprise at least one ion that is capable of crosslinking at least two gelling agent molecules. Examples of suitable crosslinkers include, but are not limited to, boric acid, disodium octaborate tetrahydrate, sodium diborate, pentaborates, ulexite and colemanite, compounds that can supply zirconium IV ions (such as, for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan, Okla. Suitable crosslinkers generally are present in the treatment fluids of the present invention in an amount sufficient to provide, in situ, the desired degree of crosslinking between gelling agent molecules. In certain embodiments of the present invention, the crosslinkers may be present in an amount in the range from about 0.001% to about 10% by weight of the water in the treatment fluid. In other embodiments of the present invention, the crosslinkers may be present in the treatment fluids of the present invention in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked treatment fluids may also include internal delayed gel breakers such as enzyme, oxidizing, acid buffer, or temperature-activated gel breakers. The gel breakers cause the treatment fluids to revert to thin fluids that can be produced back to the surface after they have been used to place the proppant aggregates in subterranean fractures. The gel breaker used is typically present in the treatment fluid in an amount in the range of from about 0.5% to about 10% by weight of the gelling agent. The treatment fluids may also include one or more of a variety of well-known additives, such as gel stabilizers, fluid loss control additives, clay stabilizers, bactericides, and the like.

According to some embodiments of the present invention, a formation stabilizing agent may be used to lock weakly consolidated or unconsolidated particulates (e.g., formation sands and fines) in place to mitigate their movement or migration.

Suitable formation stabilizing agents may include, but are not limited to, non-aqueous tackifying agents, aqueous tackifying agents, emulsified tackifying agents, silyl-modified polyamide compounds, resins, crosslinkable aqueous polymer compositions, polymerizable organic monomer compositions, consolidating agent emulsions, zeta-potential modifying aggregating compositions, and binders. Combinations and/or derivatives of these also may be suitable. Nonlimiting examples of suitable non-aqueous tackifying agents may be found in U.S. Pat. Nos. 5,853,048; 5,839,510; and 5,833,000 as well as U.S. Patent Application Publication Nos. 2007/0131425 and 2007/0131422, the entire disclosures of which are herein incorporated by reference. Nonlimiting examples of suitable aqueous tackifying agents may be found in U.S. Pat. Nos. 5,249,627 and 4,670,501, as well as U.S. Patent Application Publication Nos. 2005/0277554 and 2005/0274517, the entire disclosures of which are herein incorporated by reference. Nonlimiting examples of suitable crosslinkable aqueous polymer compositions may be found in U.S. Patent Application Publication Nos. 2010/0160187 and 2011/0030950, the entire disclosures of which are herein incorporated by reference. Nonlimiting examples of suitable silyl-modified polyamide compounds may be found in U.S. Pat. No. 6,439,309, the entire disclosure of which is herein incorporated by reference. Nonlimiting examples of suitable resins may be found in U.S. Pat. Nos. 7,673,686; 7,153,575; 6,677,426; 6,582,819; 6,311,773; and 4,585,064, as well as U.S. Patent Application Publication Nos. 2010/0212898 and 2008/0006405, the entire disclosures of which are herein incorporated by reference. Nonlimiting examples of suitable polymerizable organic monomer compositions may be found in U.S. Pat. No. 7,819,192, the entire disclosure of which is herein incorporated by reference. Nonlimiting examples of suitable consolidating agent emulsions may be found in U.S. Patent Application Publication No. 2007/0289781, the entire disclosure of which is herein incorporated by reference. Nonlimiting examples of suitable zeta-potential modifying aggregating compositions may be found in U.S. Pat. Nos. 7,956,017 and 7,392,847, the entire disclosures of which are herein incorporated by reference. Nonlimiting examples of suitable binders may be found in U.S. Pat. Nos. 8,003,579; 7,825,074; and 6,287,639, as well as U.S. Patent Application Publication No. 2011/0039737, the entire disclosures of which are herein incorporated by reference. It is within the ability of one skilled in the art, with the benefit of this disclosure, to determine the type and amount of consolidating agent to include in the methods of the present invention to achieve the desired results.

In some embodiments of the present invention, the formation stabilizing agent may be present in an amount in the range of about 0.1% to about 80% by weight of the stabilizing fluid composition. In some embodiments, the stabilizing agent may be present in an amount in the range of about 0.1% to about 40% by weight of the stabilizing fluid composition. In other embodiments, the stabilizing agent may be present in the range of about 0.1% to about 5% by weight of the stabilizing fluid composition. It is within the ability of one skilled in the art, with the benefit of this disclosure, to determine the type and amount of consolidating agent to include in the methods of the present invention to achieve the desired results.

Degradable fluid loss controlling agents suitable for use in the methods of the present invention may be of any size and shape combination. Suitable forms of degradable fluid loss controlling agents include, but are not limited to, fibers, platelets, ovals, spheres, and any combination thereof. The form and shape of the degradable fluid loss controlling agent for a particular application may depend on, among other things, the chemical composition of the treatment fluids, flow rate of the treatment fluids in the particular formation, the effective porosity and/or permeability of the particular formation, pore throat size and distribution, and the like.

Suitable examples of degradable fluid loss controlling agents that may be used in accordance with the present invention include polysaccharides such as dextran or cellulose; chitins; chitosans; proteins; aliphatic polyesters; poly(lactides); poly(glycolides); poly($\epsilon$-caprolactones); poly(hydroxybutyrates); poly(anhydrides); aliphatic or aromatic polycarbonates; poly(orthoesters); poly(amino acids); poly (ethylene oxides); and polyphosphazenes. Of these suitable polymers, aliphatic polyesters and polyanhydrides may be preferred.

Polyanhydrides are particularly suitable polymers as degradable fluid loss controlling agents useful in the present invention. Polyanhydride hydrolysis proceeds, in situ, via free carboxylic acid chain-ends to yield carboxylic acids as final degradation products. The erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

In choosing the appropriate degradable fluid loss controlling agent, one should consider the degradation products that will result. These degradation products should not adversely affect other operations or components and may even be selected to improve the long term performance/conductivity of the propped fracture. The choice of degradable material also can depend, at least in part, on the conditions of the well, e.g., well bore temperature. For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

In some embodiments a preferable result is achieved if the degradable fluid loss controlling agent degrades slowly over time as opposed to instantaneously. The slow degradation of the degradable material, in situ, helps to maintain the stability of the proppant matrix. In some embodiments a preferable result is achieved if the degradable fluid loss controlling agent degrades concurrently during placement of the treatment fluid containing proppants or proppants and degradable particulates.

In some embodiments of the present invention, the degradable fluid loss controlling agent may be present in the stabilizing fluid in the amount in the range of from about 0.1% to about 10% by weight of the stabilizing fluid. In some embodiments, it is preferred that the degradable fluid loss controlling agent be present in the stabilizing fluid in the amount in the range of from about 0.2% to about 0.5% by weight of the stabilizing fluid. One of ordinary skill in the art with the benefit of this disclosure will recognize an optimum concentration, size, and shape of the degradable fluid loss controlling agent to achieve the desired results.

Proppant particulates suitable for use in the methods of the present invention may be of any size and shape combination known in the art as suitable for use in a fracturing operation. Generally, where the chosen proppant is substantially spherical, suitable proppant particulates have a size in the range of from about 2 to about 400 mesh, U.S. Sieve Series. In some embodiments of the present invention, the proppant particulates have a size in the range of from about 8 to about 120 mesh, U.S. Sieve Series. A major advantage of using this method is there is no need for the solid particulates to be sieved or screened to a particular or specific particle mesh size or particular particle size distribution, but rather a wide or broad particle size distribution can be used.

In some embodiments of the present invention it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, or cylinder-shaped. That is, in embodiments wherein the proppant particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches to about 0.3 inches in length. In other embodiments, the longest axis is from about 0.05 inches to about 0.2 inches in length. In one embodiment, the substantially non-spherical proppant particulates are cylindrical having an aspect ratio of about 1.5 to 1 and about 0.08 inches in diameter and about 0.12 inches in length. In another embodiment, the substantially non-spherical proppant particulates are cubic having sides about 0.08 inches in length. The use of substantially non-spherical proppant particulates may be desirable in some embodiments of the present invention because, among other things, they may provide a lower rate of settling when slurried into a fluid as is often done to transport proppant particulates to desired locations within subterranean formations. By so resisting settling, substantially non-spherical proppant particulates may provide improved proppant particulate distribution as compared to more spherical proppant particulates.

Proppant particulates suitable for use in the present invention may comprise any material suitable for use in subterranean operations. Suitable materials for these proppant particulates include, but are not limited to, sand (such as beach sand, desert sand, or graded sand), bauxite, ceramic materials, glass materials (such as crushed, disposal glass material), polymer materials (such as EVA or composite materials), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, lightweight particulates, microsphere plastic beads, ceramic microspheres, glass microspheres, manmade fibers, cements (such as Portland cements), fly ash, carbon black powder, and combinations thereof. Suitable composite particulates may comprise a binder and a filler material wherein suitable filler materials include silica, alumina, fumed carbon, carbon black, graphite, mica, titanium dioxide, barite, meta-silicate, calcium silicate, kaolin, talc, zirconia, boron, fly ash, hollow glass microspheres, solid glass, and combinations thereof. Suitable proppant particles for use in conjunction with the present invention may be any known shape of material, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention.

In some embodiments, proppant may be coated with a binding fluid to encourage proppants to form aggregates with other proppants and/or with the degradable fluid loss controlling agent and the degradable particulates. Suitable binding fluids may include any of the material listed above as a suitable formation stabilizing agent, or any combination thereof.

In some embodiments of the present invention, a portion of the treatment fluid may comprise degradable particulates. One purpose of including degradable particulates in a high porosity propped fracture (be it a high porosity fracture or a frac-packed fracture) is to ensure the permeability of the propped fracture.

In some embodiments the degradable particulates used are oil-degradable materials. Where such oil-degradable proppant particulates are used, in the event the closure of the fracture undesirably compacts the proppant (thus undesirably reducing the permeability of the proppant pack) the oil-degradable proppant may be degraded by the produced fluids, thus restoring at least some of the lost permeability. The degradable proppant may also be degraded by materials purposely placed in the formation by injection, mixing the degradable particulates with delayed reaction degradation agents, or other suitable means to induce degradation.

In some embodiments of the present invention, a high porosity propped fracture may be formed using proppant particulates and degradable particulates. Thus, as the degradable particulates are removed with time, the porosity of the propped fracture increases. The degradable particulates are preferably substantially uniformly distributed throughout the formed proppant pack. Over time, the degradable material will degrade, in situ, causing the degradable material to substantially be removed from the proppant pack and to leave behind voids in the proppant pack. These voids enhance the porosity of the proppant pack, which may result, in situ, in enhanced conductivity.

Suitable degradable materials include oil-degradable polymers. Oil-degradable polymers that may be used in accordance with the present invention may be either natural or synthetic polymers. Some particular examples include, but are not limited to, polyacrylics, polyamides, and polyolefins such as polyethylene, polypropylene, polyisobutylene, and polystyrene. Other suitable oil-degradable polymers include those that have a melting point which is such that the polymer will dissolve at the temperature of the subterranean formation in which it is placed such as a wax material.

In addition to oil-degradable polymers, other degradable materials that may be used in conjunction with the present invention include, but are not limited to, degradable polymers, dehydrated salts, and/or mixtures of the two. As for degradable polymers, a polymer is considered to be "degradable" herein if the degradation is due to, in situ, a chemical and/or radical process such as hydrolysis, oxidation, or UV radiation. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

It is desirable that the degradable particulates have similar particle size, shape, and specific gravity as those of the proppant particulates used to enhance the distribution of degradable particulate among the lightweight particulate and to minimize the segregation between the particulate materials.

Suitable examples of degradable polymers that may be used in accordance with the present invention include polysaccharides such as dextran or cellulose; chitins; chitosans; proteins; aliphatic polyesters; poly(lactides); poly(glycolides); poly(ε-caprolactones); poly(hydroxybutyrates); poly(anhydrides); aliphatic or aromatic polycarbonates; poly(orthoesters); poly(amino acids); poly(ethylene oxides); and polyphosphazenes. Of these suitable polymers, aliphatic polyesters and polyanhydrides may be preferred.

Polyanhydrides are another type of particularly suitable degradable polymer useful in the present invention. Polyanhydride hydrolysis proceeds, in situ, via free carboxylic acid chain-ends to yield carboxylic acids as final degradation products. The erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

Dehydrated salts may be used in accordance with the present invention as a degradable material. A dehydrated salt is suitable for use in the present invention if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts like acetate trihydrate.

Blends of certain degradable materials may also be suitable. One example of a suitable blend of materials is a mixture of poly(lactic acid) and sodium borate where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with either the conductivity of the proppant matrix or with the production of any of the fluids from the subterranean formation.

In choosing the appropriate degradable material, one should consider the degradation products that will result. These degradation products should not adversely affect other operations or components and may even be selected to improve the long term performance/conductivity of the propped fracture. The choice of degradable material also can depend, at least in part, on the conditions of the well, e.g., well bore temperature. For instance, lactides have been found to be suitable for lower temperature wells, including those within the range of 60° F. (15.56° C.) to 150° F. (65.56° C.), and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

In some embodiments a preferable result is achieved if the degradable material degrades slowly over time as opposed to instantaneously. Even more preferable results have been obtained when the degradable material does not begin to degrade until after the proppant matrix has developed some compressive strength. The slow degradation of the degradable material, in situ, helps to maintain the stability of the proppant matrix.

In some embodiments of the present invention, from about 10% to about 90% of the total proppant particulates used to form the high porosity fracture are degradable. In other embodiments, from about 20% to about 70% of the total proppant particulates used to form the high porosity fracture are degradable. In still other embodiments, from about 25% to about 50% of the total proppant particulates used to form the high porosity fracture are degradable. One of ordinary skill in the art with the benefit of this disclosure will recognize an optimum concentration of degradable material that provides desirable values in terms of enhanced conductivity or permeability without undermining the stability of the high porosity fracture itself.

In some embodiments of the present invention, the degradable particulates are degradable solids-free gel bodies. Once placed within a fracture, the degradable components are allowed to break down into a liquid phase and are then removed from the propped fracture, leaving behind the proppant aggregates or clusters that then act as islands or pillars to keep the fractures from closing while allowing voids and channels to form surrounding the solids particulate masses, and connecting the open flow paths to the wellbore.

The amounts of degradable solids-free gel bodies are generally selected to effectively surround the proppant. Thus, in some embodiments, the degradable solids-free gel bodies are present in greater quantity than the proppant such that the proppants are spaced apart from one another when placed; thus forming high porosity propped fracture. The presence of the degradable solids-free gel bodies may help to keep the proppant from clumping together or from settling and forming a solid mass.

Gel bodies suitable for use in the present invention include those described in U.S. Patent Application Publication Nos. 2010/0089581 and 2011/0067868, the entire disclosures of which are hereby incorporated by reference. One of skill in the art will recognize that some of the gel bodies may be designed to degrade once the facture closes, while other gel bodies may be more resistant to such degradation long after the closing of the fracture. The gel used to form the solids-free gel bodies preferably degrade after the fracture closes.

By way of example, gel bodies of the present invention may be formed from swellable polymers. Preferably, the swellable particulate is an organic material such as a polymer or a salt of a polymeric material. Typical examples of polymeric materials include, but are not limited to, cross-linked polyacrylamide, cross-linked polyacrylate, cross-linked copolymers of acrylamide and acrylate monomers, starch grafted with acrylonitrile and acrylate, cross-linked polymers of two or more of allylsulfonate, 2-acrylamido-2-methyl-1-propanesulfonic acid, 3-allyloxy-2-hydroxy-1-propanesulfonic acid, acrylamide, acrylic acid monomers, and any combination thereof in any proportion. Typical examples of suitable salts of polymeric material include, but are not limited to, salts of carboxyalkyl starch, salts of carboxymethyl starch, salts of carboxymethyl cellulose, salts of cross-linked carboxyalkyl polysaccharide, starch grafted with acrylonitrile and acrylate monomers, and any combination thereof in any proportion. The specific features of the swellable particulate may be chosen or modified to provide a proppant pack or matrix with desired permeability while maintaining adequate propping and filtering capability. These swellable particulates are capable of swelling upon contact with a swelling agent. The swelling agent for the swellable particulate can be any agent that causes the swellable particulate to swell via absorption of the swelling agent. In a preferred embodiment, the swellable particulate is "water swellable," meaning that the swelling agent is water. Suitable sources of water for use as the swelling agent include, but are not limited to, fresh water, brackish water, sea water, brine, and any combination thereof in any proportion. In another embodiment of the invention, the swellable particulate is "oil swellable," meaning that the swelling agent for the swellable particulate is an organic fluid. Examples of organic swelling agents include, but are not limited to, diesel, kerosene, crude oil, and any combination thereof in any proportion.

Also by way of example, degradable gel bodies of the present invention may be formed from super-absorbent polymers. Suitable such super-absorbent polymers include polyacrylamide, crosslinked poly(meth)acrylate, and non-soluble acrylic polymers.

By increasing the percentage of open spaces within a propped fracture, the use of degradable may act not only to increase the available space for production but also to eliminate non-Darcy effects during production. Generally, non-Darcy effects are caused by inertial forces due to expansion and contraction of the local flow inside flow channels found in typical proppant packs. The high porosity propped fractures decrease or eliminate the cycles of expansion and contraction because the interstitial spaces found in traditional propped fractures are not present.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of fracturing a subterranean formation comprising:

placing a stabilizing fluid comprising a formation stabilizing agent and a degradable fluid loss controlling agent into the subterranean formation at a pressure sufficient to create or enhance at least one fracture therein, wherein the degradable fluid loss controlling agent at least partially covers a face of the fracture;

placing a treatment fluid comprising proppants into at least a portion of the fracture;

bridging the fluid loss controlling agent, the proppants, or both at or near the tip of the fracture to induce a tip screenout;

forming a proppant pack in the portion of the fracture; and degrading the degradable fluid loss controlling agent to degrade, wherein degradation of the degradable fluid loss controlling agent and placement of the treatment fluid occurs concurrently.

2. The method of claim 1 wherein the formation stabilizing agent is selected from the group consisting of a non-aqueous tackifying agent, an aqueous tackifying agent, an emulsified tackifying agent, a silyl-modified polyamide compound, a resin, a crosslinkable aqueous polymer composition, a polymerizable organic monomer composition, a consolidating agent emulsion, a zeta-potential modifying aggregating composition, a binder, and any combination thereof.

3. The method of claim 1 wherein the degradable fluid loss controlling agent is selected from the group consisting of a polysaccharide, a chitin, a chitosan, a protein, an aliphatic polyester, a poly(lactide), a poly(glycolide), a poly($\epsilon$-caprolactone), a poly(hydroxybutyrate), a poly(anhydrides), an aliphatic polycarbonate, a poly(orthoester), a poly(amino acid), a poly(ethylene oxide), a polyphosphazene, any derivative thereof, and any combination thereof.

4. The method of claim 1 wherein the degradable fluid loss controlling agent has a form selected from the group consisting of a fiber, a platelet, an oval, a sphere, and any combination thereof.

5. The method of claim 1 wherein the degradable fluid loss controlling agent degrades before production begins.

6. The method of claim 1 wherein the proppants are coated with a binding fluid selected from the group consisting of a non-aqueous tackifying agent, an aqueous tackifying agent, an emulsified tackifying agent, a silyl-modified polyamide compound, a resin, a crosslinkable aqueous polymer composition, a polymerizable organic monomer composition, a consolidating agent emulsion, a zeta-potential modifying aggregating composition, a binder, and any combination thereof.

7. The method of claim 1 wherein the treatment fluid further comprises degradable particulates selected from the group consisting of degradable polymers, oil-degradable polymers, dehydrated salts, solids-free gel bodies, and any combination thereof.

8. The method of claim 1 wherein the treatment fluid is placed into the fracture to induce a widening of the fracture after induction of the tip screenout.

9. The method of claim 1 wherein the tip screenout is not induced until introduction of the treatment fluid.

10. A method of fracturing a subterranean formation comprising:

placing a stabilizing fluid comprising a formation stabilizing agent and a degradable fluid loss controlling agent into the subterranean formation at a pressure sufficient to create or enhance at least one fracture therein, wherein the degradable fluid loss controlling agent at least partially covers a face of the fracture;

placing a treatment fluid comprising proppants and degradable particulates, into at least a portion of the fracture;

bridging the fluid loss controlling agent, the proppants, or both at or near the tip of the fracture to induce a tip screenout;

forming a proppant pack in the portion of the fracture; and degrading the degradable fluid loss controlling agent and the degradable particulates to degrade, wherein degradation of the degradable fluid loss controlling agent and placement of the treatment fluid occurs concurrently.

11. The method of claim 10 wherein the formation stabilizing agent is selected from the group consisting of a non-aqueous tackifying agent, an aqueous tackifying agent, an emulsified tackifying agent, a silyl-modified polyamide compound, a resin, a crosslinkable aqueous polymer composition, a polymerizable organic monomer composition, a consolidating agent emulsion, a zeta-potential modifying aggregating composition, a binder, and any combination thereof.

12. The method of claim 10 wherein the degradable fluid loss controlling agent is selected from the group consisting of a polysaccharide, a chitin, a chitosan, a protein, an aliphatic polyester, a poly(lactide), a poly(glycolide), a poly($\epsilon$-caprolactone), a poly(hydroxybutyrate), a poly(anhydrides), an aliphatic polycarbonate, a poly(orthoester), a poly(amino acid), a poly(ethylene oxide), a polyphosphazene, any derivative thereof, and any combination thereof.

13. The method of claim 10 wherein the degradable fluid loss controlling agent has a form selected from the group consisting of a fiber, a platelet, an oval, a sphere, and any combination thereof.

14. The method of claim 10 wherein the degradable fluid loss controlling agent degrades before production begins.

15. The method of claim 10 wherein the proppants are coated with a binding fluid selected from the group consisting of a non-aqueous tackifying agent, an aqueous tackifying agent, an emulsified tackifying agent, a silyl-modified polyamide compound, a resin, a crosslinkable aqueous polymer composition, a polymerizable organic monomer composition, a consolidating agent emulsion, a zeta-potential modifying aggregating composition, a binder, and any combination thereof.

16. The method of claim 10 wherein the degradable particulates are selected from the group consisting of degradable polymers, oil-degradable polymers, dehydrated salts, solids-free gel bodies, and any combination thereof.

17. The method of claim 10 wherein the treatment fluid is placed into the fracture to induce a widening of the fracture after induction of the tip screenout.

18. The method of claim 10 wherein the tip screenout is not induced until introduction of the treatment fluid.

* * * * *